United States Patent
Zhao

(10) Patent No.: US 11,121,997 B1
(45) Date of Patent: Sep. 14, 2021

(54) SYSTEMS, DEVICES, AND METHODS FOR DETERMINING A NON-EPHEMERAL MESSAGE STATUS IN A COMMUNICATION SYSTEM

(71) Applicant: Snap Inc., Santa Monica, CA (US)

(72) Inventor: Haibo Zhao, Venice, CA (US)

(73) Assignee: Snap Inc., Santa Monica, CA (US)

( * ) Notice: Subject to any disclaimer, the term of this patent is extended or adjusted under 35 U.S.C. 154(b) by 1222 days.

(21) Appl. No.: 14/833,621

(22) Filed: Aug. 24, 2015

(51) Int. Cl.
*H04L 12/58* (2006.01)
*G06F 40/30* (2020.01)

(52) U.S. Cl.
CPC .............. *H04L 51/18* (2013.01); *G06F 40/30* (2020.01); *H04L 51/22* (2013.01)

(58) Field of Classification Search
CPC ........................................................ H04L 51/32
See application file for complete search history.

(56) References Cited

U.S. PATENT DOCUMENTS

| | | | |
|---|---|---|---|
| 5,754,939 A | 5/1998 | Herz et al. | |
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

(Continued)

*Primary Examiner* — Rupal Dharia
*Assistant Examiner* — Steven C Nguyen
(74) *Attorney, Agent, or Firm* — Schwegman Lundberg & Woessner, P.A.

(57) ABSTRACT

Methods and devices are presented for managing communications in an ephemeral communication system. In some embodiments, messages in the system are associated with a default trigger for deleting each message following an initial viewing of the message. A non-ephemeral analysis module analyses elements of the message to identify any content elements indicating that a message status should be changed from a default ephemeral status to a non-ephemeral status. Following identification of such elements in the message, the message status is changed from ephemeral to non-ephemeral. Based on the non-ephemeral message status, a copy of the message may be automatically stored in a non-ephemeral format, or a default trigger for deletion of the message may be changed.

20 Claims, 10 Drawing Sheets

(56) References Cited

U.S. PATENT DOCUMENTS

| | | |
|---|---|---|
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carter et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesiadek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1* | 11/2012 | Shi .......................... H04L 67/02 715/205 |
| 2012/0304080 A1 | 11/2012 | Wormald et al. |
| 2013/0071093 A1 | 3/2013 | Hanks et al. |
| 2013/0080928 A1* | 3/2013 | Zhuang ............... H04L 12/1822 715/758 |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0134582 A1* | 5/2016 | Rubinstein ............ H04L 65/403 709/206 |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |

(56) References Cited

FOREIGN PATENT DOCUMENTS

| | | |
|---|---|---|
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible for", [Online] Retrieved from the internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptIt>, (Dec. 13, 2005), 2 pgs.

\* cited by examiner

600

```
ACCESSING, USING A FIRST DEVICE, A FIRST MESSAGE OF A FIRST
MESSAGE TYPE IN THE COMMUNICATION SYSTEM, WHEREIN A
FIRST MESSAGE STATUS FOR THE FIRST MESSAGE IS AN
EPHEMERAL STATUS, AND WHEREIN THE FIRST MESSAGE IS
ASSOCIATED WITH A DEFAULT TRIGGER FOR DELETION OF THE
FIRST MESSAGE BASED ON THE EPHEMERAL STATUS
602
```

```
ANALYZING CONTENT OF THE FIRST MESSAGE FOR CONTENT
ELEMENTS ASSOCIATED WITH A NON-EPHEMERAL STATUS
604
```

```
IDENTIFYING ONE OR MORE CONTENT ELEMENTS FROM THE
CONTENT OF THE FIRST MESSAGE, WHEREIN THE ONE OR MORE
CONTENT ELEMENTS ARE ASSOCIATED WITH A NON-EPHEMERAL
STATUS
606
```

```
CHANGING, BY THE DEVICE, THE FIRST MESSAGE STATUS FROM
THE EPHEMERAL STATUS TO A NON-EPHEMERAL STATUS BASED
ON THE IDENTIFYING OF THE ONE OR MORE CONTENT ELEMENTS
ASSOCIATED WITH THE NON-EPHEMERAL STATUS
608
```

```
MODIFYING, BY THE DEVICE IN RESPONSE TO THE CHANGING OF
THE FIRST MESSAGE STATUS TO THE NON-EPHEMERAL STATUS,
THE ASSOCIATION OF THE FIRST MESSAGE WITH THE DEFAULT
TRIGGER FOR DELETION OF THE FIRST MESSAGE
610
```

*FIG. 6*

SYSTEMS, DEVICES, AND METHODS FOR DETERMINING A NON-EPHEMERAL MESSAGE STATUS IN A COMMUNICATION SYSTEM

BACKGROUND

Electronic communications, such as e-mail or text messages, images, video, multimedia, etc., over networks, such as the Internet, can be a very convenient means of communication. However, security concerns can limit the appeal of such communications. For example, while encryption may provide a degree of privacy and security for a message while the message is in transit, once the message is received by recipients, the sender of the message typically loses control over how the message is dealt with by the recipients. For example, a message sender may only wish the recipient to be in possession of the message for a specific period of time, but the recipient may choose to retain the message in his or her message store beyond that period. Ephemeral messages set to be automatically deleted after a specific trigger event or a specified period of time may be used to address this concern, and therefore efficient systems and methods for processing the temporary data of such ephemeral messages are desirable. Embodiments described herein related to improved systems, methods, and devices for messaging in such communication systems.

BRIEF DESCRIPTION OF THE DRAWINGS

Various ones of the appended drawings merely illustrate example embodiments of the present disclosure and should not be considered as limiting its scope.

FIG. 6 describes a method for analyzing and processing messages according to some example embodiments.

DETAILED DESCRIPTION

Figure 1:
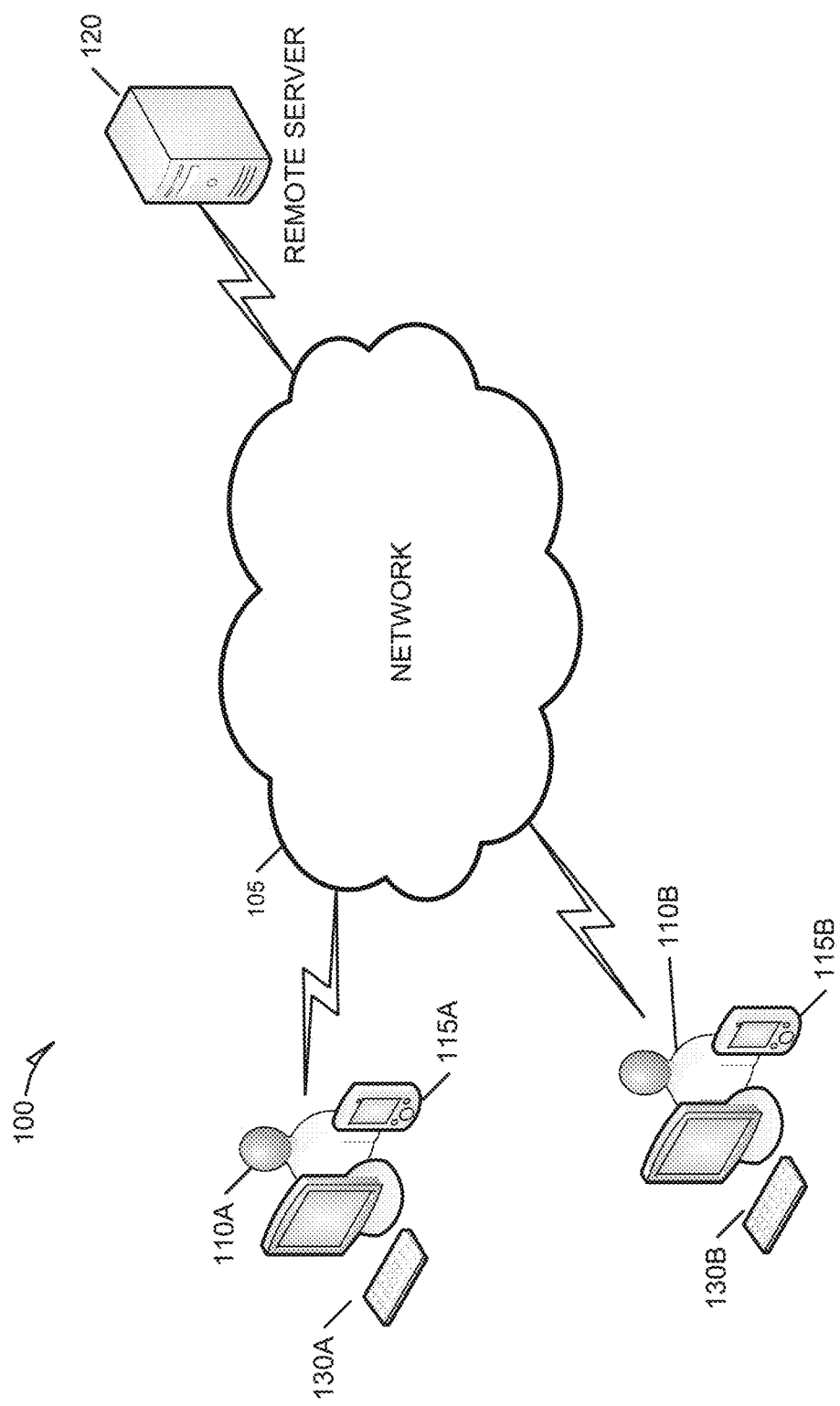
FIG. 1 is a diagram illustrating a networked system that may be used for communications according to some example embodiments.

The description that follows includes details of devices and methods related to managing messages in a communication system. In the following description, for the purposes of explanation, numerous specific details are set forth in order to provide an understanding of various embodiments. It will be evident, however, that additional embodiments that are not specifically described are also possible in accordance with the present innovations. In general, well-known instruction instances, protocols, structures, and techniques are not necessarily shown in detail.

Some embodiments relate to devices and instructions executed by one or more processors of a device to manage messages in a communication system designed for ephemeral messages. As described herein, a communication system for ephemeral messages is a system that is designed to limit recipient access to some or all messages communicated using the system. For example, some ephemeral message systems may be configured to automatically delete a message after the message has been displayed on a screen for a certain amount of time. Some ephemeral message systems may be configured to automatically delete a chat message when a user navigates away from a user interface element presenting the chat message. Other embodiments can limit access to messages in other ways, or may use different combinations of limitations.

As described below, several embodiments described herein analyze elements of a message to set or adjust the limitations on user access to the message. This analysis is based on elements of the message. For example, messages including contact details, lists, reminders, meeting information, directions, or other such information that is determined by the system to be intended for future access may be identified as "non-ephemeral." Such non-ephemeral messages may then either be stored in a new format or may have a message deletion trigger altered. The analysis of messages to determine whether or not they should be set with an ephemeral or non-ephemeral status may be performed in a variety of ways, including use of semantic analysis, bag-of-words analysis, semantic vector machine (SVM) analysis, Bayesian decision modeling, or other computer-implemented modeling to categorize a message. While some embodiments may be limited to analyzing text or strings of characters to determine a non-ephemeral status for chat, text, or other messages made up primarily of letters and numbers, in other embodiments, images or video may also be analyzed for content that may indicate that a message is non-ephemeral. Thus, some embodiments may apply to chat and text messaging systems, while other embodiments may include systems for communicating images and video clips.

After a message is categorized, the system may further monitor user interaction with the message to update analysis processes. For example, if a user takes an action to store a message categorized as ephemeral, the system may use this to modify models used in the analysis of future messages.

FIG. 1 is a diagram illustrating a networked system 100 that may be used for communications according to some example embodiments. The networked system 100 is configured to transmit messages between user devices such as mobile devices 115 or other client devices 130 over a network 105 (e.g., the Internet). The mobile devices 115 may comprise smart phones, network-enabled tablets, laptop computers, phablets, vehicle-integrated computers, wearable devices, or any other such mobile computing machines. The other client devices 130 may be more static client devices such as desktop computers, home network devices such as appliances or televisions, or any other such computing devices. These devices include applications, modules, and/or circuitry to enable ephemeral messages to be communicated between the various devices. Additional details related to ephemeral message devices and modules are discussed below.

In various embodiments, device analysis to determine whether a message is ephemeral or non-ephemeral may be performed in different ways by different devices. In some embodiments, all such processing may be performed by a device receiving a message. In other embodiments, such processing may be performed by a remote server 120 or a device sending a message. In some embodiments, rather than automatically setting a status for a message, an analysis may result in a user prompt presented at a user interface suggesting a message status as ephemeral or non-ephemeral and requesting user approval.

In still further embodiments, a device may include user settings influencing the use of analysis systems for determining a non-ephemeral status. For example, a mobile device 115A may include a setting with a default ephemeral status but with permission to allow a mobile device 115B to determine a non-ephemeral status for messages sent by the mobile device 115A to the mobile device 115B. In other embodiments, the mobile device 115A may include a similar setting to allow the remote server 120 to determine a non-ephemeral status for messages sent by the mobile device 115A to the mobile device 115B. In other embodiments, the mobile device 115A may perform an initial analysis to select a message status prior to sending a message, but may provide permissions to either the remote server 120 or the mobile device 115B to adjust the message status based on an additional analysis. In still further embodiments, a sending device may include an interface input to override user settings. For example, if the mobile device 115A has a user setting to allow the mobile device 115A to automatically set a status, the user interface may force a particular message to the mobile device 115B to be associated with a message status set as ephemeral regardless of any analysis.

In some embodiments, the remote server 120 enables communication between devices, and may store copies of messages as part of system transmission of the messages between users 110 including example user 110A and 110B. In some embodiments, messages may be stored in a non-durable memory of the remote server 120 for a time period before being copied to a durable memory so that messages that are identified as ephemeral and quickly read by the recipients may simply be deleted from the remote server 120. Thus, when a message is determined to be ephemeral, either by a default ephemeral status or a message status being set to an ephemeral value following an analysis, the message may be deleted from the remote server 120 as well as from the device receiving the message.

Figure 2:
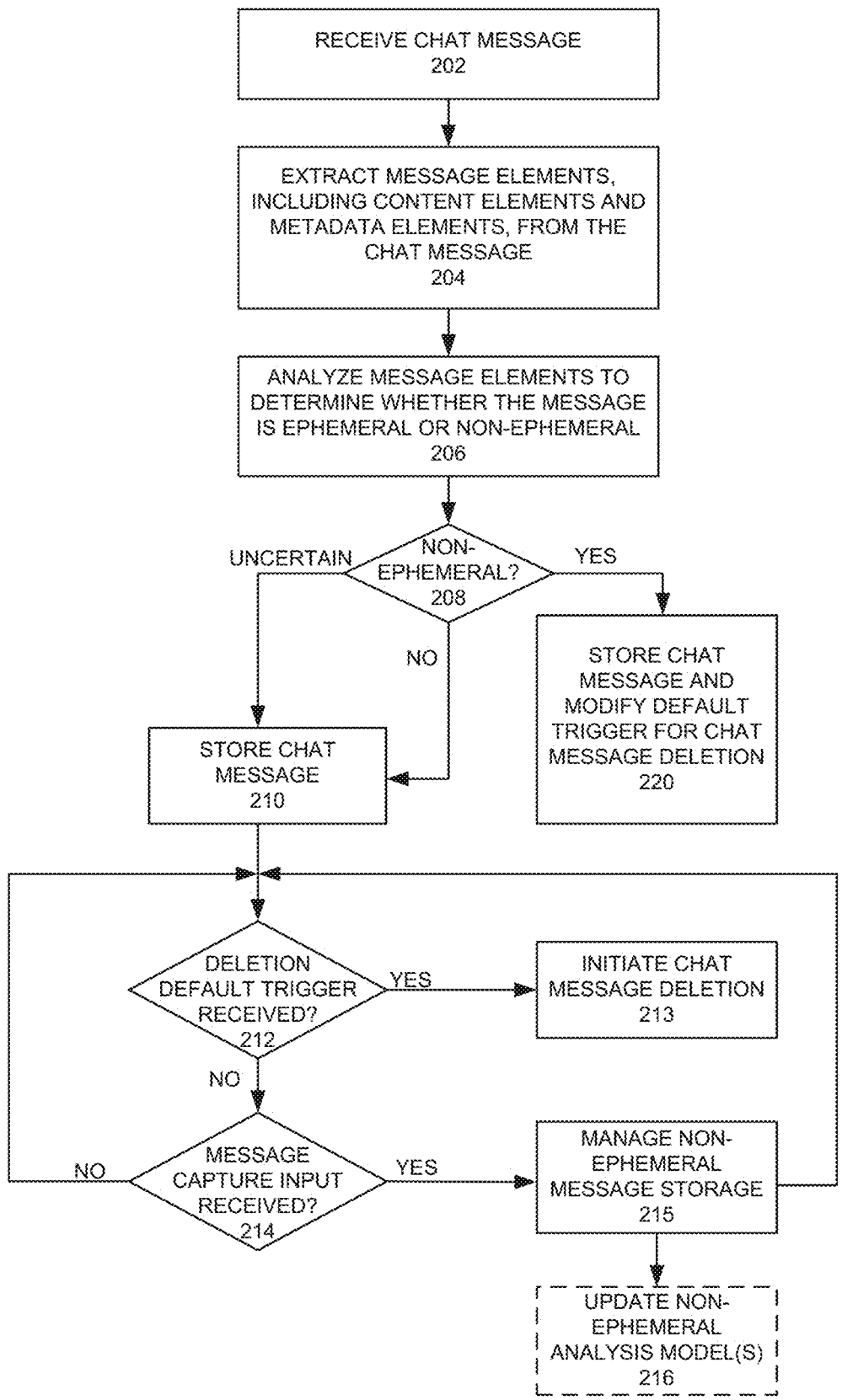
FIG. 2 is a flowchart describing aspects of a system for analyzing and processing messages according to some example embodiments.

FIG. 2 is a flowchart describing aspects of a system for analyzing and processing messages by a device receiving a message according to some example embodiments. In one embodiment, for example, a method implementing the flowchart of FIG. 2 may be enabled on a mobile device 115B or a client device 130B that is receiving a chat message using computer readable instructions for an ephemeral message system operating on the device, with the message sent by another device such as a mobile device 115A or a client device 130A. For the purposes of illustration, FIG. 2 is described with respect to the mobile devices 115A and 115B in the networked system 100 of FIG. 1. It will be apparent that these operations and similar embodiments may be used with other devices or with other systems. Additionally, FIG. 2 describes a process using a chat message. Such a message may include text and image data as content elements of the message, and other information such as sender details, sent time, chat identifiers, or any other such metadata as part of the message. Various other embodiments may use other message types including any combination of such data or other types of data.

In operation 202, the mobile device 115B receives a chat message from the mobile device 115A via the network 105 and the remote server 120. This reception may use an antenna and wireless communication circuitry for various different wireless technologies as described below. In operation 204, the mobile device 115B extracts message elements from the received message. This includes identifying both content elements and metadata elements. These elements may be extracted using various decoding or text parsing modules or elements as part of a device or as part of instructions executed by processors of a device. This information may then be sent to a non-ephemeral analysis module that uses the information extracted in operation 204 to set a message status as part of operation 206.

In operation 206 these message elements may be analyzed in a variety of different ways. In some embodiments, a single analysis type may be used, but in other embodiments, multiple different types of analysis may be used. Similarly, some embodiments may have analysis customized for individual users based on user inputs and system feedback from previous messages. This includes feedback that may be based on the user 110B operating the mobile device 115B, the user 110A that generated the message sent from the mobile device 115A, and any other custom information related to previous messages analyzed by the system, including variations in time, content categories, or any other such information from previously analyzed messages. Additional details related to the analysis of a message to set a message status as non-ephemeral are discussed below with respect to FIG. 4.

Decision 208 results from the analysis of operation 206. If the message is identified as ephemeral (or not non-ephemeral), or there is otherwise any uncertainty or error with the decision analysis, then the system, operating as a default ephemeral messaging system, stores the message in operation 210, but maintains a default trigger for deletion of the message. Such a trigger may be based on a variety of different structures for an ephemeral message system that defaults to message deletion much earlier than non-ephemeral messaging systems. In some embodiments, an ephemeral message system may be considered a system that defaults to deleting a message shortly after the message is viewed and without user input selecting the deletion. A default trigger for message deletion may be message deletion when a user navigates away from a user interface displaying a message, message deletion when the message has been displayed on a user interface for a certain number of seconds, or other such deletion triggers.

After the message is stored in operation 210, the system monitors user inputs to identify the deletion default trigger associated with an ephemeral message as part of operation 212, and further monitors to determine if a user takes an action to store a message identified as ephemeral with a non-ephemeral message capture action in operation 214. If a deletion default trigger is received as part of the operation of the mobile device 115B, then a chat message deletion operation is initiated in operation 213. This may include not only deletion of the message content on the mobile device 115B, but also may include signaling to the remote server 120 to delete any message content stored at the remote server 120. In some embodiments, for example, a message may be sent to multiple devices of a single user such as the mobile device 115B and the client device 130B of the user 110B. The chat message deletion process may signal the remote server 120 to delete the message from the remote server 120 and from any other devices such as the client device 130B in addition to the mobile device 115B. In some embodiments, a notification may additionally be sent to the sending mobile device 115A with read-receipt and/or deletion notifications.

Additionally, instructions or the application operating on the mobile device 115B as part of the ephemeral message system may operate as part of the system to monitor when a message capture action or an unexpected file access or modification occurs with respect to the message content. For example, if a screenshot or other message capture input is received at the mobile device 115B and used to modify or generate a non-ephemeral copy of the message in operation 215, then this information may be captured and used as feedback to modify the models used to set a message status as ephemeral or non-ephemeral in operation 216. The system may then continue monitoring the copy of the message in the system as an occurrence of a deletion trigger or additional message capture inputs.

Returning to the decision 208 resulting from the analysis of operation 206, if the message is identified as non-ephemeral, then in operation 220, the chat message is stored as a non-ephemeral message. Because the messaging system is an ephemeral message system with a deletion default trigger for all messages, this trigger is modified in response to the determination that the message is non-ephemeral. In some embodiments, this may involve removing all message deletion triggers. In some embodiments, this may involve extending a message viewing time, or changing from one type of deletion trigger to another. For example, a trigger to delete the message after a user has navigated away from the message in a user interface may be changed to a time-based trigger where the message may be deleted after a certain number of hours or days. In some embodiments, the new trigger may be based on the analysis of operation 206. For example, if the message content includes a meeting invitation with an address and contact information for a certain date and time, a deletion trigger may be set for that date and time, or for a set delay after that date and time.

In one embodiment of operation 220, for example, a default trigger for all chat messages in an ephemeral chat message network operating on a network communication system may be a delete-on-close trigger. Such a default trigger may initiate and manage deletion of a chat message when a device receiving the message first presents the message on an output, and then receives an input command to navigate away from the chat message. In some embodiments, a determination that the chat message should be categorized as non-ephemeral based on an analysis of the message may change the trigger to a delete-after-expiration time trigger, where the message is set for deletion after a certain amount of time, or when a date and time passes.

In some embodiments, the storage of the message as a non-ephemeral message may additionally involve storing the message in a new data format. For example, if the message is received in a format for ephemeral messaging that operates only for temporary storage of ephemeral data within an ephemeral messaging application, the content of the data may be stored in a text file, an image file, or any other such non-ephemeral format within the mobile device 115B.

Additionally, just as described above for the ephemeral data deletion, saving of a message as a non-ephemeral message may involve communication to the remote server 120 and the mobile device 115A to inform these other network communication elements that the message has been saved as a non-ephemeral message. Any updated deletion triggers may be provided and implemented for copies of the data stored at the remote server 120, or the data may simply be saved in a non-ephemeral backup storage of the remote server 120. Notifications about message storage and viewing may also be communicated to the mobile device 115A.

Figure 3:
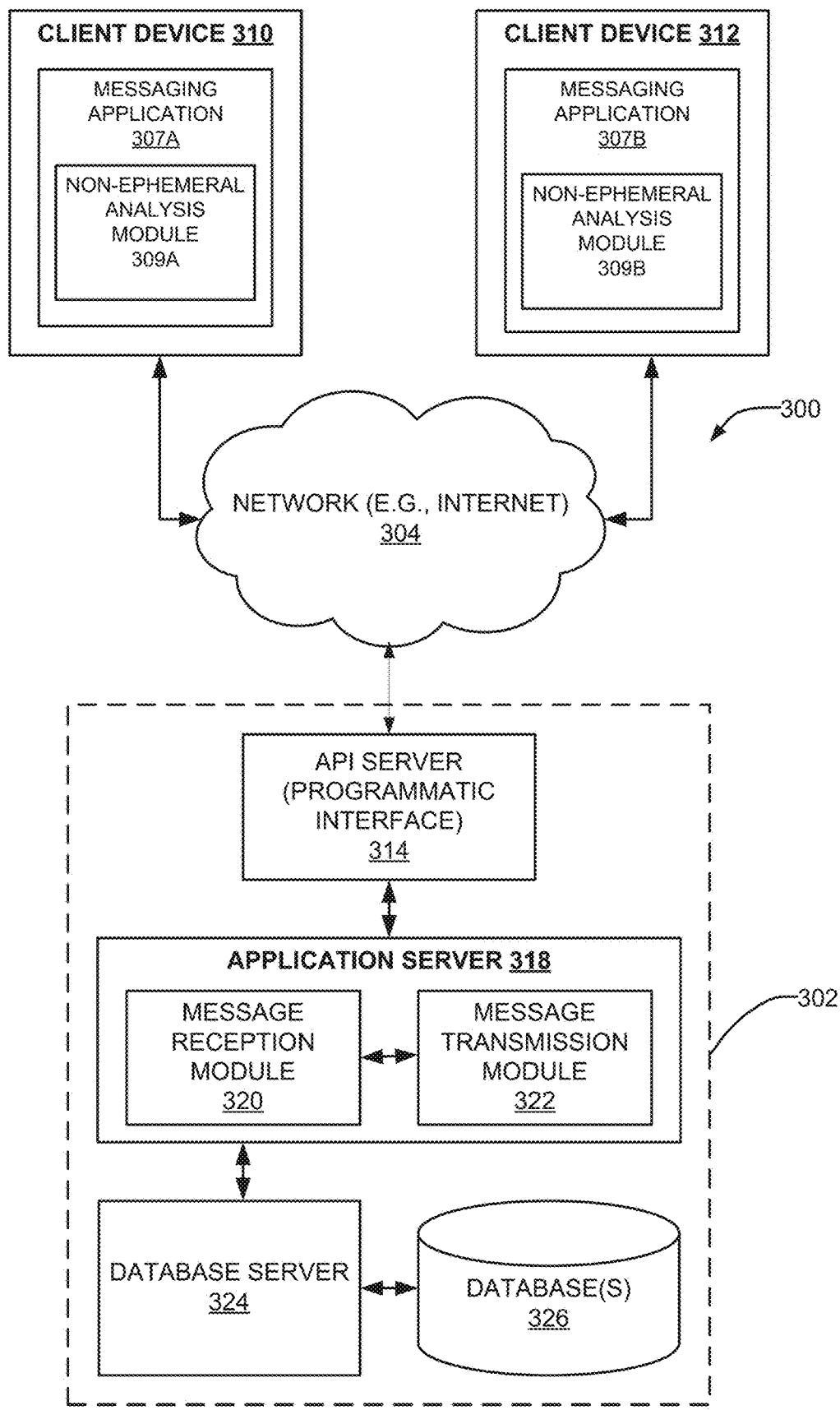
FIG. 3 is a diagram illustrating a network system that may be used for ephemeral communications according to some example embodiments.

FIG. 3 is a diagram illustrating a network system 300 that may be used for ephemeral communications according to some example embodiments. The network system 300 has a client-server architecture configured for exchanging data over a network, according to one embodiment. Although the network system 300 is illustrated herein as having a client-server architecture, other embodiments may include other network architectures, such as peer-to-peer or distributed network architectures.

The network system 300 includes a client device 310 and a client device 312 communicatively coupled to each other and to a data exchange platform 302 via a network 304 (e.g., the Internet). The data exchange platform 302, in an example, includes a message reception module 320 and a message transmission module 322, and may provide server-side functionality via the network 304 to one or more clients. Although the message reception module 320 and the message transmission module 322 are described as residing on a server (e.g., application server(s) 318) in some embodiments, in other embodiments some or all of the functions of the message reception module 320 and the message transmission module 322 may be provided by a client device. The one or more clients may include users that use the network system 300 to exchange data over the network 304. These operations may include transmitting, receiving (communicating), and processing data to, from, and regarding content and users of the network system 300. The data may include, but is not limited to, content and user data such as user profiles, messaging content, messaging attributes, client device information, and geolocation information, among others.

In various embodiments, the data exchanges within the network system 300 may be dependent upon user-selected functions available through one or more client or user interfaces (UIs). The UIs may be associated with a client machine, such as the client devices 310, 312 using instances of a messaging application 307A, 307B on each device, such as a client application. The messaging application 307 may be in communication with the message reception module 320 and the message transmission module 322 via an application server 318. The client devices 310, 312 may comprise mobile devices with wireless communication components and applications for sending specific types of electronic messages (e.g., ephemeral messages) over the network 304 (e.g., using messaging application 307).

In addition to the system managing communication and storage of messages among the client device 310, the client device 312, and the application server 318, the different messaging applications 307A and 307B operating on the corresponding client devices 310 and 312 may have respective non-ephemeral analysis modules 309A and 309B. In various embodiments, these non-ephemeral analysis modules 309A, 309B may analyze outgoing or incoming messages to categorize the messages based on different elements of the messages such as content elements and metadata elements.

Figure 4:
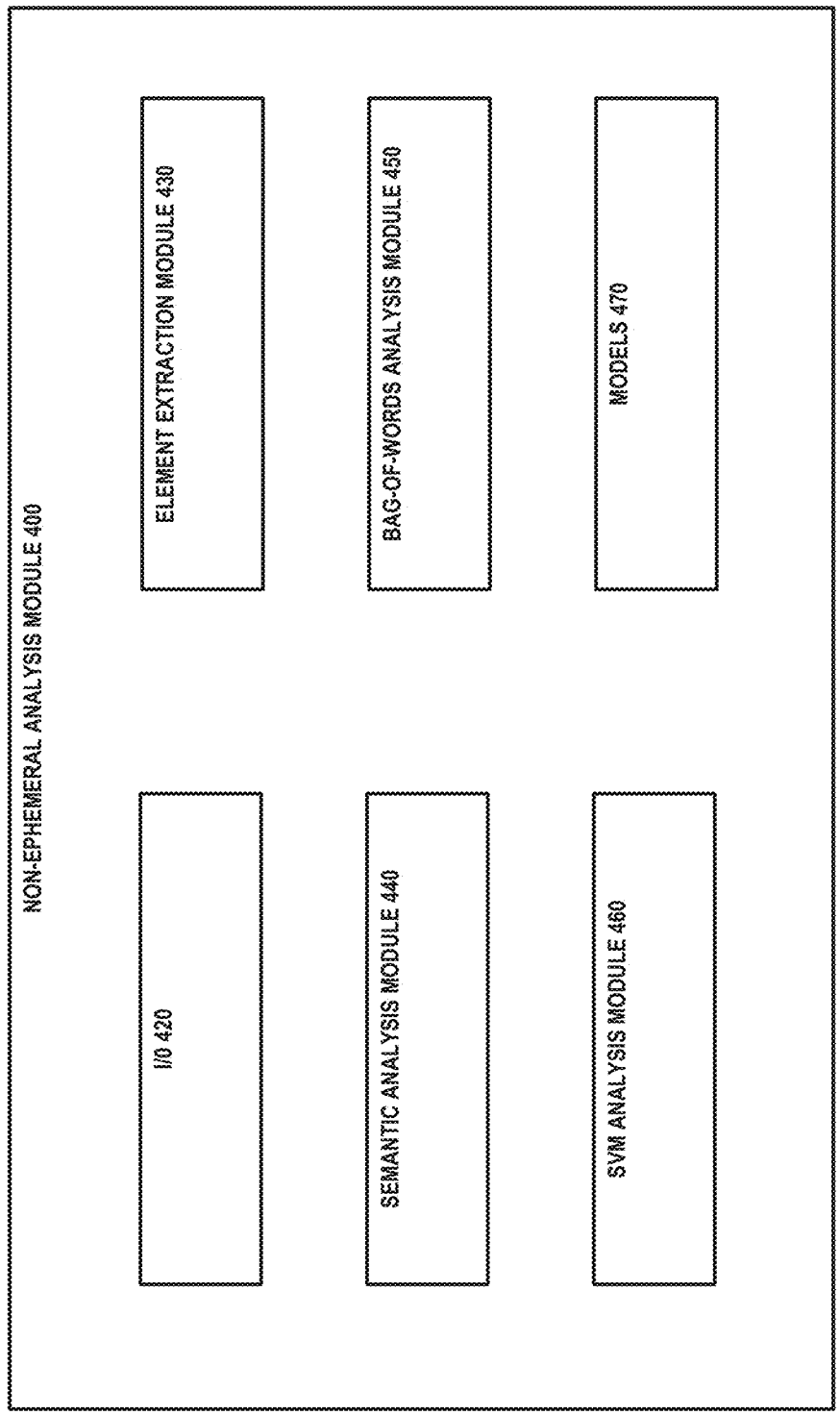
FIG. 4 is a diagram illustrating aspects of one implementation of a non-ephemeral analysis module for use with some embodiments.

FIG. 4 is a diagram illustrating aspects of one implementation of a non-ephemeral analysis module 400 for use with some embodiments. In some embodiments of the network system 300, the non-ephemeral analysis modules 309A and 309B are similar to the non-ephemeral analysis module 400. In other embodiments, implementations with different modules or module combinations are possible. Additional details related to the non-ephemeral analysis module 400 are discussed below.

An application program interface (API) server 314 is coupled to, and provides a programmatic interface to, the one or more application server(s) 318 that host the message reception module 320 and the message transmission module 322. The application server 318 is, in turn, shown to be coupled to one or more database servers 324 that facilitate access to one or more database(s) 326. The one or more database(s) 326 may store copies of messages sent to and from the client devices 310, 312, and may communicate with the client devices 310, 312 to delete ephemeral messages when deletion triggers occur at the client devices 310, 312.

The API server 314 communicates and receives data pertaining to messages, among other things, via various user input tools. For example, the API server 314 may send and receive data to and from an application (e.g., via the messaging application 307) running on another client machine (e.g., client devices 310, 312 or a third-party server).

In one example embodiment, the message reception module 320 provides messaging functionality for users of the client devices 310, 312 to send ephemeral messages that automatically disappear after a triggering event has been detected. For example, the messages may disappear after they have been viewed by the recipient for a specified period of time. The client devices 310, 312 can access and view the messages via the application server(s) 318, which may access the message content from, for example, the database (s) 326, which, as mentioned above, works with other aspects of the system to delete ephemeral messages at the appropriate time.

Various different triggering events may be used to initiate deletion of an ephemeral message, as described above. In an additional embodiment, the triggering event for deleting a message comprises a responding to the message at the client device 312 prior to the expiration of the specified time period, for example, by sending a return message prior to the expiration of the specified time period without closing the messaging application 307.

FIG. 4 is a diagram illustrating aspects of one implementation of a non-ephemeral analysis module 400 for use with some embodiments. The non-ephemeral analysis module 400 includes an input/output (I/O) module 420, an element extraction module 430, a semantic analysis module 440, a bag-of-words analysis module 450, a semantic vector machine (SVM) analysis module 460, and other models 470.

The I/O module 420 manages data storage and communication for the various modules, as well as accepting message information and providing one or more status outputs associated with a message. In some embodiments, the output may be a simple binary ephemeral or non-ephemeral decision output. In some embodiments, an insufficient information or uncertainty threshold may be included and an unknown output may be provided to allow system feedback as a message is monitored to enable a device to respond in different ways. For example, in some embodiments, an uncertainty associated with a message status may be used by an application operating on a client device to prompt a user for action regarding a message. In other embodiments, an uncertain decision may prompt a communication to a sending device for a decision or additional information about whether a message should be designated as ephemeral or non-ephemeral. In still further embodiments, more complex analysis decisions may be output using the I/O module 420, such as decision information regarding specific trigger threshold changes including recommended storage times or deletion triggers.

The element extraction module 430 may take the message input and may extract different parts of the message. For example, text that is content entered by a user as part of a message may be separated from metadata that was appended to a message by the messaging application or other parts of the network communication system. These elements may be analyzed or used in various different ways by the different analysis modules and models.

The remaining modules comprise different example algorithms, models, or computing systems for generating the output decision information from the input message data. In addition to the actual content data and metadata from the message, the various modules may use other information such as dictionary information, lists of model rules, history feedback data from other previous analyses as well as subsequent user actions, or any other such data that may be used by a model. In some embodiments, multiple different types of models may be used and combined to arrive at a decision related to a message status. In such embodiments, each model may have a separate influence or value score, with the overall output from all models measured against one or more decision thresholds which determine a final message status based on the total output scores compared against the threshold-based categorizations.

The semantic analysis module 440 may implement various machine learning semantic analysis algorithms or models to identify structures or patters in messages that are associated with information expected to be accessed later outside of a system's standard ephemeral message deletion patterns. For example, lists such as grocery lists that are generated to provide a reminder to a user may be identified as messages that a user does not want automatically deleted after the message is viewed for the first time. Similarly, addresses, phone numbers, and other contact information may be identified by the semantic analysis module 440 by the structure of the information, and may be categorized as non-ephemeral based on the identification of these structures in a message. For example, when a system analyzes a chat message stating "My number is (555) 555-5555. Don't lose it", the semantic analysis module 440 may identify the phone number structure and indicate that the chat message is non-ephemeral.

The bag-of-words analysis module 450 implements a bag-of-words model, a simplifying representation used in language processing and information retrieval. Such a model disregards word order and grammar, and uses the words or tokens irrespective of order. Certain embodiments of such a model may build a dictionary of words from training information or initial system operator inputs, and use this dictionary to associate words or groups of words in a message with a non-ephemeral status. Words or phrases such as "remember" or "don't forget" may be used either to set a non-ephemeral status or to adjust an overall score for a message towards a threshold associated with selecting a non-ephemeral status. When analyzing the chat message above, "My number is (555) 555-5555. Don't lose it", the bag-of-words analysis module 450 may identify the words "Don't", "lose", and "it" in close proximity, and determine that these words in close proximity are associated with a non-ephemeral status.

Some embodiments may additionally operate with a standard non-word string included in the content of the message to be taken as an indicator from the user generating the message that the message is intended to be non-transitory. If, for example, the string is "", then the user typing the chat message may include this string in the message. In the example above, the user sending the message enters the text "My number is (555) 555-5555. Don't lose it", and this message may be sent out from the user's client device with this text. The non-ephemeral analysis module 400 may then do a simple text parse of the content element including this text, searching for the text string "**". When this string is found, the message is automatically set as non-ephemeral. In various embodiments, single characters or other strings may be used. In still further embodiments, a user interface input at the sending device may set a metadata value indicating the message as non-ephemeral, and the receiving device may simply read this metadata value. In still further embodiments, even if a text or chat message includes a string or metadata value indicating that the message is non-ephemeral, the non-ephemeral analysis module 400 may still analyze the message, and may determine based on the content of the message that the receiver will set the message as ephemeral, even though the sending device indicated that the message was non-ephemeral. This may occur, for example, when a user wishes to delete certain content to save memory resources, or when training and history data for the receiving user indicate that the type of content is treated as ephemeral by the receiving device more than a threshold percentage of the time.

The SVM analysis module 460 comprises another type of analysis algorithm or model that may be implemented as part of decision-making analysis in the non-ephemeral analysis module 400. An SVM is a learning model that analyses data and recognizes patterns, particularly associated with classification and regression analysis. To generate an SVM for determining a non-ephemeral status, a set of initial training examples are provided, comprising messages that are associated with either an ephemeral status or a non-ephemeral status. Various known SVM algorithms may then use this training data to build a non-probabilistic binary linear classifier model that assigns new examples into one category or the other.

In addition to these models, the other models 470 may be used either in conjunction with the above modules or in place of the above modules in different embodiments. Examples of additional machine learning modules include Bayesian network modules, decision tree modules, neural network modules, relevance vector machine modules, or other such machine implemented classification modules.

Figure 5:
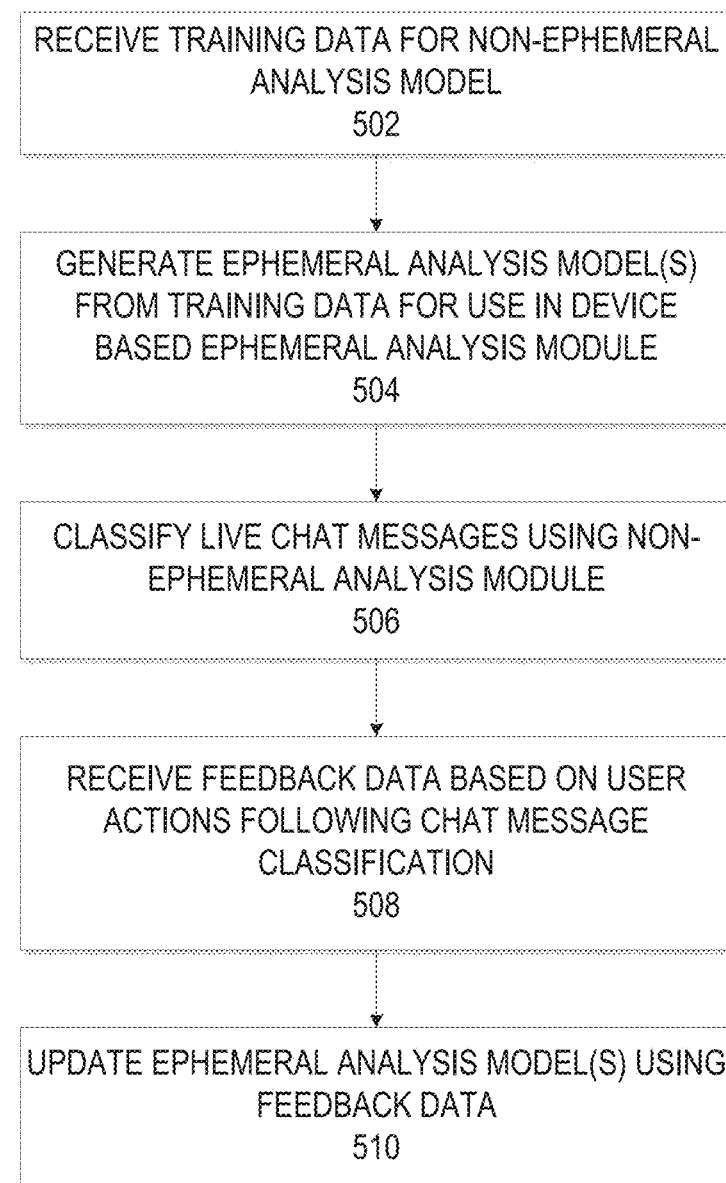
FIG. 5 describes a method for analyzing and processing messages according to some example embodiments.

FIG. 5 illustrates a method 500 for generating models or sets of analysis instructions for a non-ephemeral analysis to be performed by a device. The method 500 begins with operation 502, involving a system receiving training data for a non-ephemeral analysis model. This may include various examples of data that a system operator wants to be classified as non-ephemeral, as well as examples of messages including data that the system operator does not want classified as non-ephemeral. This information is then analyzed using a training algorithm to generate a model, using techniques for the associated supervised machine learning processes, including SVM or other supervised processes, in operation 504. In operation 506, the model generated using training data in operation 504 is used classify live chat messages using the model as integrated in a non-ephemeral analysis module. Additionally, data regarding user actions or an absence of user actions taken toward the messages may be stored as feedback data in operation 508. For example, as described above, a user screenshot of a chat message classified as ephemeral may be stored as feedback data contradicting the classification of the message as ephemeral. The live message data may then be incorporated with the additional user action data gathered following classification of the live data to either confirm or contradict the generated classification. These confirmations and contradictions may be used as feedback data to update the non-ephemeral analysis model(s) in operation 510.

FIG. 6 describes a method 600 for analyzing and processing messages according to some example embodiments. The method 600 is a method performed by a device such as the client devices 130A, 130B, mobile devices 115A, 115B, or client devices 310, 312. The method 600 begins with operation 602, which involves accessing a first message of a first message type in a communication system, wherein a first message status for the first message is an ephemeral status, and wherein the first message is associated with a default trigger for deletion of the first message based on the ephemeral status. As discussed above, messages in an ephemeral communication system may be associated with an ephemeral status as a default condition, such that the use of a default trigger for deletion of the message following a basic interaction with the message is a default for all messages in the system.

Operation 604 involves analyzing the first message for elements associated with a non-ephemeral status using a non-ephemeral analysis module. Details of such an analysis are discussed above, particularly with respect to the non-ephemeral analysis module 400, and additionally with respect to each of the other systems, devices, instructions, and methods described above. At operation 606, as part of any analysis for identifying a non-ephemeral message, one or more content elements are identified by the analysis of operation 604 from the content of the first message, wherein the one or more content elements are associated with a non-ephemeral status. In certain embodiments, both content and metadata elements of a message may be analyzed to determine and identify the non-ephemeral status. In other embodiments, metadata elements alone may be used to select a non-ephemeral status for a message.

Following the identification of elements associated with the non-ephemeral status in operation 606, a status of the message is changed to a non-ephemeral status from the default ephemeral status in operation 608. This change may be indicated by removal or adjustment of a trigger for deleting the message, in operation 610. In other embodiments, this change may be indicated by a value change in a metadata status flag associated with or part of the message as originally sent in the system. This change in the message status may be indicated by a memory storage process to record the message content in a new data format. In other embodiments, other actions may indicate this change in message status from ephemeral to non-ephemeral.

Figure 7:
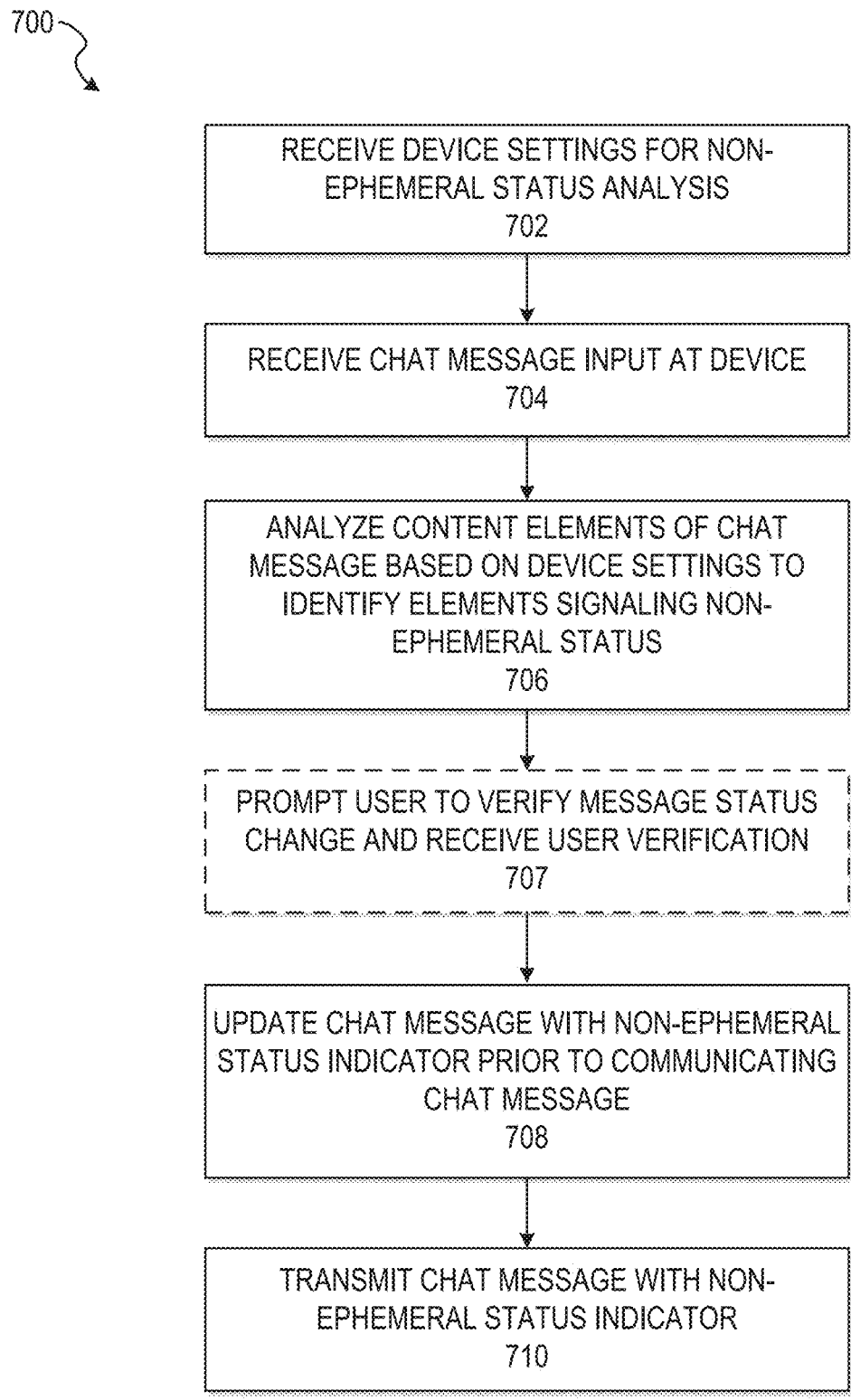
FIG. 7 describes a method for analyzing and processing messages according to some example embodiments.

FIG. 7 describes a method 700 performed by a device sending a message as part of a communication in an ephemeral communication system, with an analysis for non-ephemeral status performed by the sending device. For example, a user operating the client device 310 of FIG. 3 may enter a message for communication to the client device 312. The method 700 may be performed by the client device 310 as part of the process for sending a chat message to the client device 312.

The method 700 begins with a device receiving a set of device settings for non-ephemeral status analysis in operation 702. This may, for example, be a user input enabling a messaging application to automatically determine whether a message should be ephemeral or not, or may be a user input enabling a messaging application to perform a non-ephemeral analysis and then prompt a user for approval. In some embodiments, device settings received at one device may be used for multiple devices by an account for a single user that is managed by a server computer. For example, settings received at the mobile device 115A of FIG. 1 may be managed by the remote server 120 and applied to operations at the client device 130A. In some embodiments, the settings may be default settings received as part of initial installation or operation of a messaging application.

In operation 704, the user uses the messaging application to enter a chat message at the device. In operation 706, the content of the chat message entered to the sending device is analyzed. This analysis may be performed by a non-ephemeral analysis module 400, or some other analysis module. The analysis of operation 706 may use any method described herein to identify elements of a message indicating a non-ephemeral status. In certain embodiments, if multiple messages are generated and sent quickly, the multiple messages may be linked such that a non-ephemeral message status for one message may influence status decisions for another message. This influence may be more than simply using previous messages as history data, but may be considering the multiple messages that are sent independently as a single message sent using multiple communications, where the contents of the multiple messages are considered when setting a non-ephemeral status of any of the individual messages. Such a limitation may be based on a time delay between messages to a single receiving user account or device that is below a threshold, or may be based on messages sent to and received from a set of user accounts or devices.

In some embodiments, as mentioned above, when the analysis of operation 706 identifies elements signaling a non-ephemeral status, an optional operation 707 may be performed based on user settings to display a prompt asking for an input to verify or reject a change of the message status to a non-ephemeral status. As part of such an operation, a user may provide an input to the device, with the device receiving the input at a user interface and using the input to initiate a status change for the message.

In operation 708, the chat message received as part of operation 704 is updated with a non-ephemeral status indicator, and in operation 710, the message is transmitted with the non-ephemeral status indicator. When the message is received at the target device or at the server computer managing communications with a user account or device targeted to receive the message, either the message may be processed accepting the non-ephemeral status, or an additional non-ephemeral analysis may be performed using both the non-ephemeral status indicator and the other message elements to make a determination as to whether the status for the message should be changed back to an ephemeral message status.

In some embodiments, additional operations may then be performed to receive additional chat messages at the same device that performed operations 702 through 710. Different messages may be analyzed and be set as ephemeral or non-ephemeral based on the analysis of each individual message.

Additionally, as described above, in some embodiments, a second chat message may be received within a certain time period or following a first response message received in response to the chat message entered in operation 704. In certain embodiments, content of an entire chat conversation may be used to determine whether a chat message is ephemeral. In such an embodiment, the contents of one or more previously sent messages and one or more previously received messages as part of a chat conversation may be analyzed to determine whether individual messages or the entire linked set of messages comprising the conversation should be set as non-ephemeral. In some embodiments, deletion triggers may be updated for individual messages and/or for an entire linked conversation each time a new message is communicated as part of the chat conversation.

Figure 8:
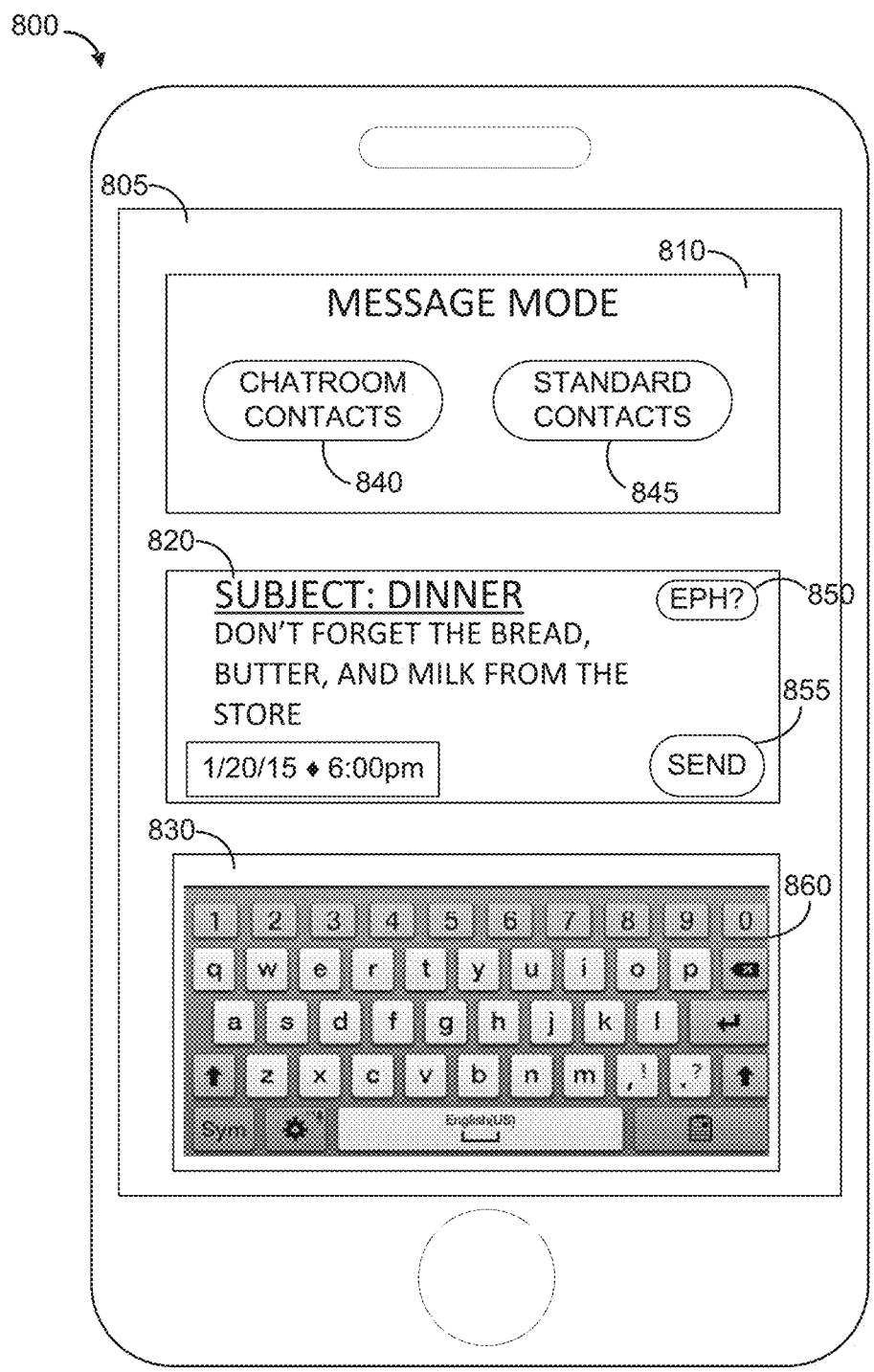
FIG. 8 illustrates an example device and aspects of a user interface according to some embodiments.

FIG. 8 is a display diagram illustrating messaging user interface options provided to a user (e.g., user 110A) of a client device 800 in the form of a mobile computing device. In various embodiments, the client device 800 may be similar to the mobile devices 115A, 115B, client devices 130A, 130B, client devices 310, 312, or any other client device described herein. In other embodiments, other user interfaces may be used. As shown in FIG. 8, the client device 800, including a display 805 and at least one processor, may send and/or receive a communication from a server module such as the message reception module 320 or the message transmission module 322 via the application server(s) 318. In some embodiments, for example, the communication may initiate a short conversation with another client device of the application server(s) 318. The client device 800 may present to a user, via user interface objects that may be generated by an application such as the messaging application 307 (e.g., user interface objects 810, 820 and 830 on the display 805), options associated with sending and receiving messages via application server(s). As explained above, the message reception module 320 of the application server(s) 318 may store a message received from the client device 800 for varying lengths of time depending on an ephemeral or non-ephemeral status associated with the message.

In the example of FIG. 8, the user of the client device 800 may launch a messaging application for the purpose of sending an ephemeral message to another client device. The user may then be presented with a selection of messaging modes via a user interface object 810 which provides message mode options 840 and 845 for user selection. A chatroom mode may be available via the option 840 to be used for synchronous communications between users, while a standard mode may be available via the option 845. In the example of FIG. 8, a selection of the option 840 or the option 845 will launch separate contact lists associated with the respective message modes, although the reverse process could also be used, so that selecting a contact (via a contact list) that is associated with a message mode will trigger the associated message mode. A non-ephemeral indicator may be included in the message based on many other factors. For example, the indicator may be included in the message based on a recognized subject or character string typed into a subject line displayed in a user interface object 820 via a keyboard 860 of a user interface object 830. In other embodiments, a non-ephemeral user interface input such as an input 850 may be used to flag a message as non-ephemeral. Other factors, such as a recipient of the message, may also be used. Furthermore, any response to the chatroom mode message in the chatroom will also include the non-ephemeral indicator based on being part of the same conversation as the original chatroom mode message.

In the example of FIG. 8, the user of the client device 800 may input a command to send the message via a user option 855 of the user interface object 820, and this will result in the message being transmitted from the client device 800 to a message reception module of an application server. The message will then be stored in a memory of the server based on the indicator included in the message (e.g., sent via chatroom mode). The message transmission module of the application server will then transmit the message to one or more receiving client devices associated with a user account identified by the message input to the client device 800. The request could, for example, be automatic based on the user having indicated an availability for chatroom communications. The message transmission module of the server may insert instructions in the message to instruct the receiving client device to store the message in memory for only a specified time period and/or to display the message for only a specified time period (e.g., specified by the chatroom mode of operation of the client device) so that the message is an "ephemeral" message. The message transmission module may then delete the message from whichever of the server memories it is currently stored in based on the specified time period expiring (or any other such trigger action occurring).

While the methods described above present operations in a particular order, it will be appreciated that alternate embodiments may operate with certain operations occurring simultaneously or in a different order. In many such embodiments, the order and timing of operations may vary between instances of the operations.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 9:
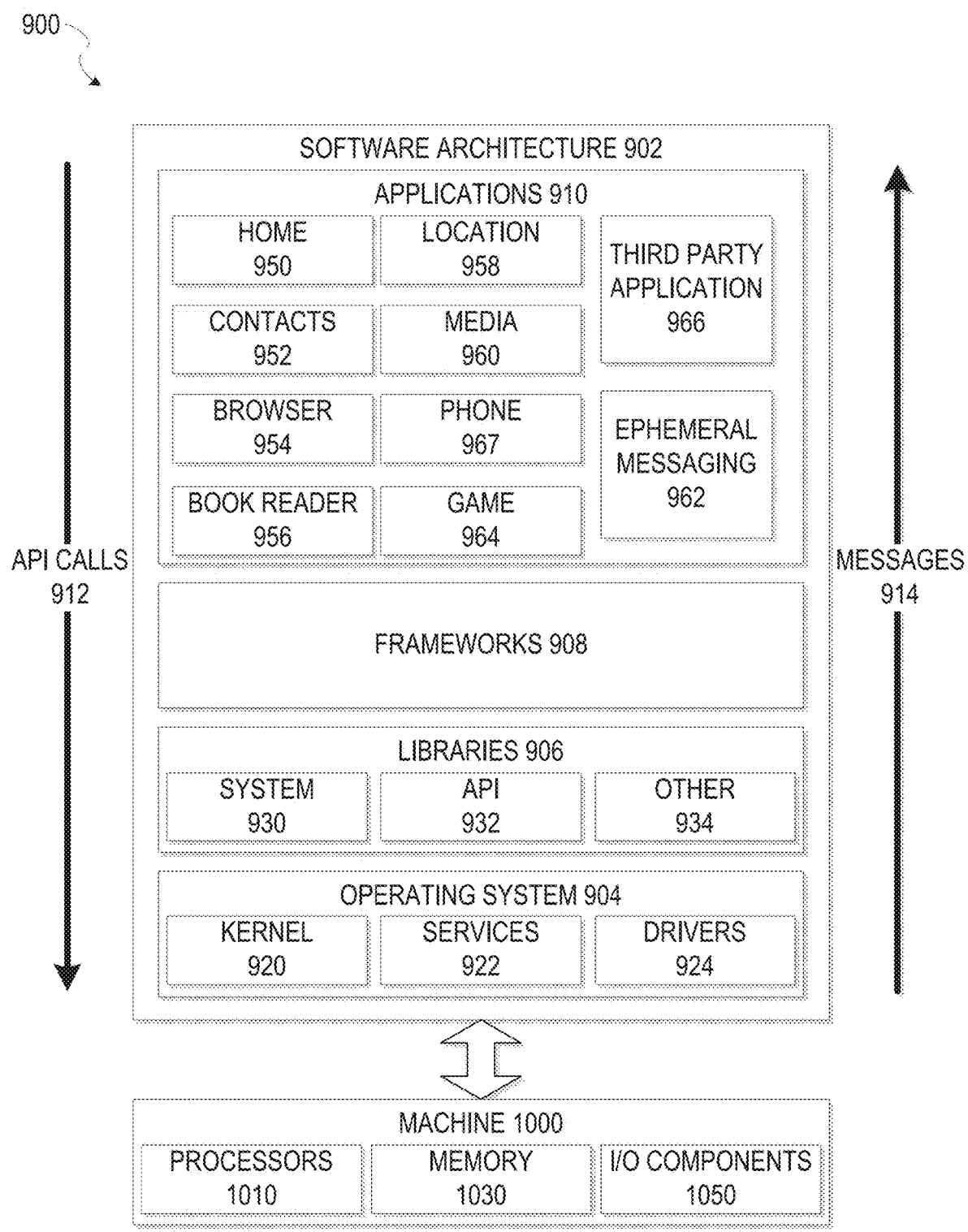
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a phone application 967, an ephemeral messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
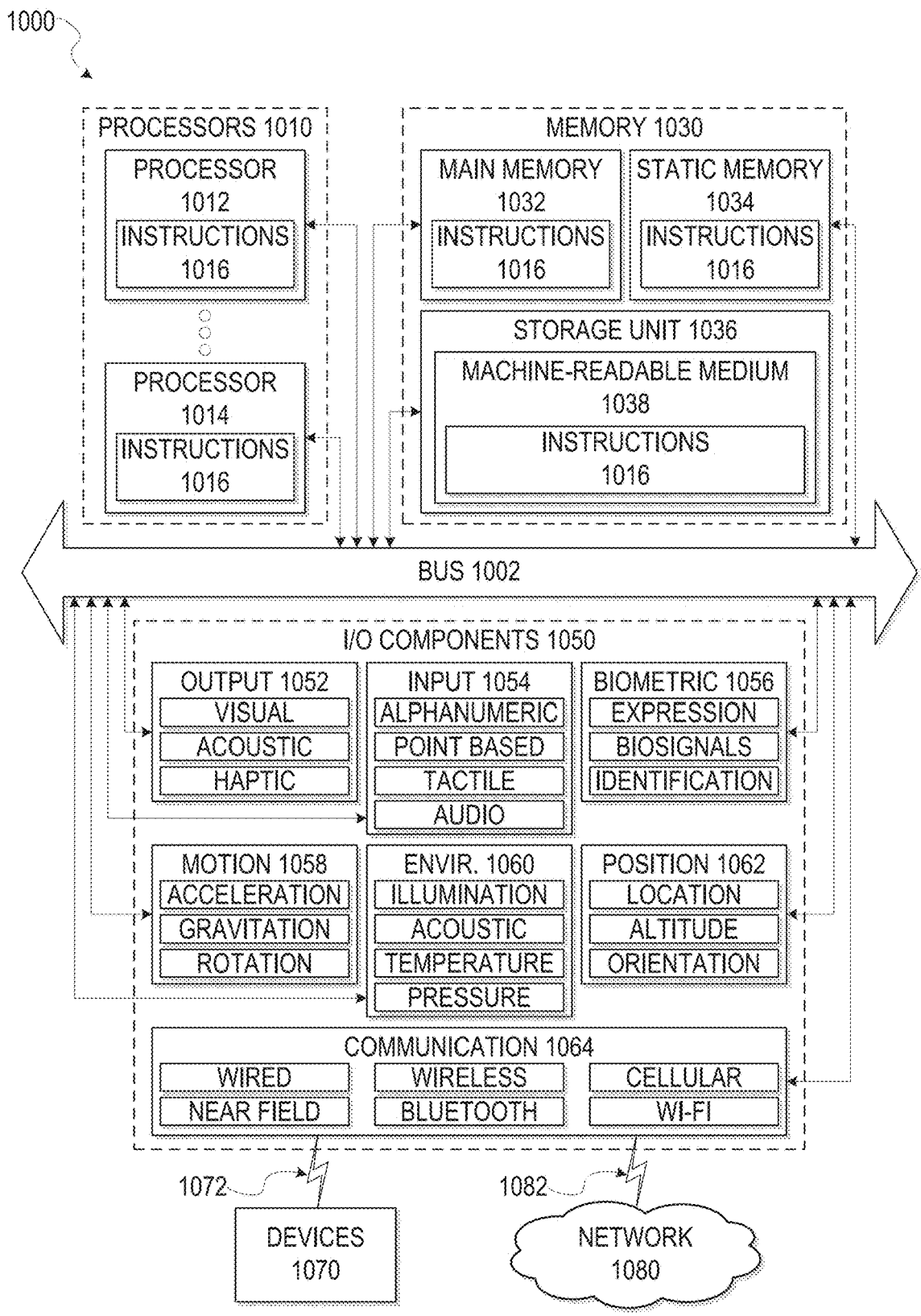
FIG. 10 is a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the machine-readable medium 1038 should be considered as being transportable from one physical location to another. Additionally, since the machine-readable medium 1038 is tangible, the machine-readable medium 1038 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of processing ephemeral messages in a communication system, the method comprising:
   accessing, using a first device, a first message of a first message type in the communication system, wherein a first message status for the first message is an ephemeral status, and wherein the first message is associated with a default trigger for deletion of the first message based on the ephemeral status;
analyzing the first message for elements associated with a non-ephemeral status using a non-ephemeral analysis module;
identifying one or more content elements from content of the first message, wherein the one or more content elements are associated with the non-ephemeral status; and
changing, by the first device, the first message status from the ephemeral status to the non-ephemeral status based on the identifying of the one or more content elements associated with the non-ephemeral status.

2. The method of claim 1 wherein analyzing the first message for the elements associated with the non-ephemeral status comprises parsing the first message for a non-word string previously identified as associating messages comprising the non-word string with the non-ephemeral status.

3. The method of claim 1 wherein analyzing the first message for the elements associated with the non-ephemeral status comprises analyzing the one or more content elements using a bag-of-words analysis module of the first device.

4. The method of claim 1 wherein analyzing the first message for the elements associated with the non-ephemeral status comprises analyzing the one or more content elements using a support vector machine analysis module.

5. The method of claim 1 wherein analyzing the first message for the elements associated with the non-ephemeral status comprises analyzing the one or more content elements using two or more of:
a semantic analysis module, a string matching module, a bag-of-words analysis module, and a support vector machine analysis module.

6. The method of claim 1 further comprising:
receiving, at the first device, a user input associated with storage or deletion of the first message; and
updating the non-ephemeral analysis module based on the user input.

7. The method of claim 1 wherein a default status for each message of the first message type in the communication system is the ephemeral status, wherein the ephemeral status is associated with the default trigger for deletion of each message associated with the ephemeral status.

8. The method of claim 1 further comprising:
receiving the first message at the first device from a second device prior to accessing the first message by the first device; and
modifying, by the first device in response to the changing of the first message status to the non-ephemeral status, the association of the first message with the default trigger for deletion of the first message.

9. The method of claim 8 wherein modifying the association of the first message with the default trigger comprises changing a deletion trigger from a delete-on-close trigger to a delete-after-expiration-time trigger.

10. The method of claim 1 further comprising:
receiving the first message at the first device from a second device prior to accessing the first message by the first device; and
automatically storing, by the first device in response to the changing of the first message status to the non-ephemeral status, a copy of the first message in a non-ephemeral data format.

11. The method of claim 1 further comprising:
displaying the first message on a display of the first device as part of the communication system;
receiving a user input to close the first message; and
deleting the first message from the first device in response to the user input to close the first message;
wherein the default trigger for deletion of the first message based on the ephemeral status comprises the user input to close the first message.

12. The method of claim 1 further comprising:
accessing, using the first device, a second message of the first message type in the communication system, wherein a second message status for the second message is the ephemeral status, and wherein the second message is associated with the default trigger for deletion of the first message based on the ephemeral status;
analyzing the second message for elements associated with the non-ephemeral status using the non-ephemeral analysis module; and
maintaining the ephemeral status for the second message based on results of the analysis by the non-ephemeral analysis module.

13. The method of claim 12 further comprising:
receiving, at the first device, a screen capture input to store content of the second message; and
updating the non-ephemeral analysis module based on the screen capture input to store the content of the second message and the ephemeral status for the second message.

14. The method of claim 1 further comprising:
receiving a set of user inputs at the first device entering the content of the first message; and
communicating the first message from the first device to a second device;
wherein changing, by the first device, the first message status from the ephemeral status to the non-ephemeral status comprises adding a non-ephemeral status indicator to the first message prior to communicating the first message to the second device.

15. The method of claim 14 further comprising:
receiving, at the first device, a set of user settings to process each message input to the first device with the non-ephemeral analysis module;
displaying, on a display of the first device prior to changing the first message status from the ephemeral status to the non-ephemeral status, a user verification message for the non-ephemeral status; and
receiving, in response to the display of the user verification message, a user verification input;
wherein the first message status is further changed to the non-ephemeral status in response to the user verification input.

16. The method of claim 14 wherein the non-ephemeral status indicator comprises a non-word character string added to the content of the first message.

17. A device comprising:
a memory;
a display, the display configured to display messages as part of a communication system;
an input device configured to receive a first message from a network as part of the communication system, wherein a first message status for the first message is an ephemeral status, and wherein the first message is associated with a default trigger for deletion of the first message based on the ephemeral status; and
one or more processors coupled to the memory, the display, and the input device, the one or more processors implementing a non-ephemeral analysis module configured to:
analyze the first message for elements associated with a non-ephemeral status;

identify one or more content elements from content of the first message, wherein the one or more content elements are associated with the non-ephemeral status; and change the first message status from the ephemeral status to the non-ephemeral status based on the identifying of the one or more content elements associated with the non-ephemeral status.

18. The device of claim 17 wherein the one or more processors are further configured to:

initiate presentation on the display of the first message; and modify, in response to the changing of the first message status to the non-ephemeral status, the association of the first message with the default trigger for deletion of the first message to an association with a non-ephemeral trigger for deletion of the first message.

19. A non-transitory computer readable medium comprising computer readable instructions that, when executed by one or more processors of a device, configure the device to:

access a first message of a first message type in a communication system, wherein a first message status for the first message is an ephemeral status, and wherein the first message is associated with a default trigger for deletion of the first message based on the ephemeral status;

analyze the first message for elements associated with a non-ephemeral status using a non-ephemeral analysis module;

identify one or more content elements from content of the first message, wherein the one or more content elements are associated with the non-ephemeral status;

change the first message status from the ephemeral status to the non-ephemeral status based on the identifying of the one or more content elements associated with the non-ephemeral status; and modify, in response to the changing of the first message status to the non-ephemeral status, the association of the first message with the default trigger for deletion of the first message to an association with a non-ephemeral trigger for deletion of the first message.

20. The non-transitory computer readable medium of claim 19 wherein the instructions to analyze the first message comprise instructions for the non-ephemeral analysis module comprising one or more of a semantic analysis module, a string matching module, a bag-of-words analysis module, and a support vector machine analysis module.

* * * * *